United States Patent [19]

DaSalvo

[11] Patent Number: 5,062,174
[45] Date of Patent: Nov. 5, 1991

[54] PORTABLE RAMP

[76] Inventor: Stanley A. DaSalvo, R.R. #1, Lombardy, Ontario, Canada, K06 1L0

[21] Appl. No.: 574,802

[22] Filed: Aug. 30, 1990

[30] Foreign Application Priority Data

Aug. 30, 1989 [CA] Canada .................................. 609.937

[51] Int. Cl.$^5$ .............................................. E01D 1/00
[52] U.S. Cl. ........................................ 14/69.5; 14/2.4; 14/71.1
[58] Field of Search .................. 14/2.4, 2.1, 69.5, 71.1

[56] References Cited

U.S. PATENT DOCUMENTS

| | | | |
|---|---|---|---|
| 3,642,156 | 2/1972 | Stenson | 414/537 |
| 4,528,711 | 7/1985 | Packer | 14/69.5 |
| 4,571,144 | 2/1986 | Guidry | 414/537 |
| 4,635,311 | 1/1987 | Helmke | 14/2.4 |
| 4,825,492 | 5/1989 | Zehavi et al. | 14/2.4 |
| 4,864,673 | 9/1989 | Adaway et al. | 14/71.1 |

Primary Examiner—Bruce M. Kisliuk
Assistant Examiner—Nancy P. Connolly

[57] ABSTRACT

A ramp for use in loading off road vehicles on pick up trucks. The ramp includes a number of ramp panels joined at lateral edges by hinges for foldably connecting the panels and longitudinal hinge means for foldably connecting support panels at or adjacent to both side edges of the ramp panels so that the support panels fold with ramp panels. In use the ramp panels are coplanar and the support panels are normal to the ramp panels to support a load on the top surface of the ramp panel.

3 Claims, 2 Drawing Sheets

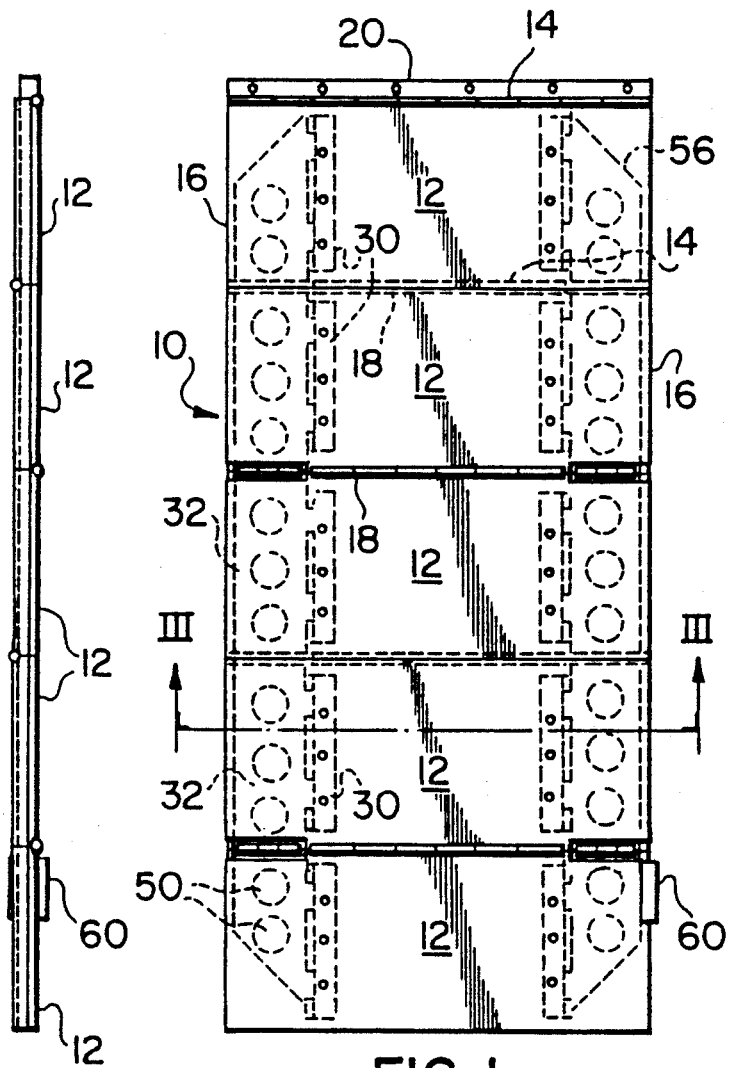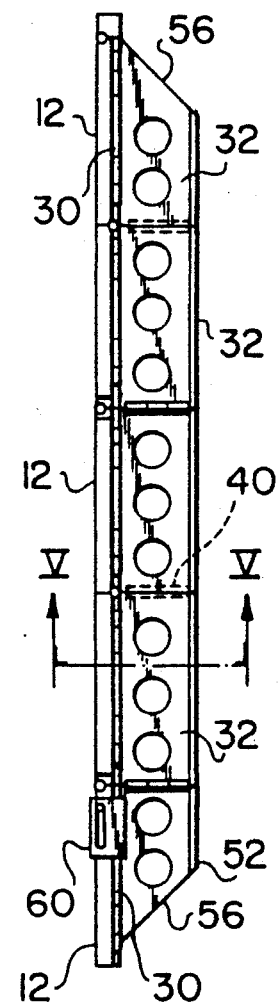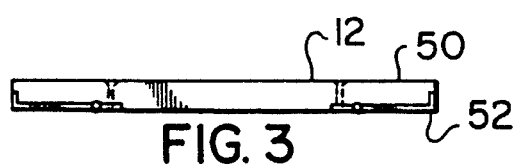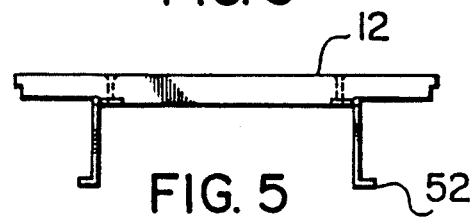

PORTABLE RAMP

BACKGROUND OF THE INVENTION

The present invention relates to ramps used for loading vehicles and more particularly to a portable lightweight foldable ramp.

Trailers are commonly used to transport off-road vehicles, however, they are expensive and increase fuel consumption.

Transporting utility and off-road vehicles such as garden tractors and snowmobiles on pick up trucks rather than trailers presents a problem due to difficulties of loading and unloading. The use of ramps permanently attached to the truck or providing fixed loading and unloading ramps at both the loading and unloading sites is not convenient. Make shift ramps provided on site or carried by the vehicle are unsafe and may result in damage to expensive off-road vehicles or machinery. Furthermore such make shift ramps are usually large, heavy and difficult or hazardous to transport.

Large ramp panels may be difficult to store on the vehicle or may create hazards if not properly secured to the vehicle.

The proposed solutions to the problem of providing a portable ramp have not been entirely satisfactory. For example U.S. Pat. No. 3,976,209 discloses pivotal legs to support the ramp which are not capable of being adjusted. U.S. Pat. No. 1,115,775 discloses a vertical support member which prevents folding the ramp in a compact state and U.S. Pat. No. 4,761,847 shows a flexible support cable and bracket means for folding ramp which could be improperly connected and cause failure of the ramp.

It is the object of the present invention to provide a portable and lightweight ramp which is compact for storage and transportation purposes.

A further object of the present invention is the provision of a ramp which has a built in load bearing system which does not require intermediate ground contacting supports.

A still further object is the provision of a ramp which is readily unfolded simple to use and capable of being manufactured at reasonable cost.

SUMMARY OF THE INVENTION

Accordingly the present invention provides a portable folding ramp comprising a plurality of ramp panels each panel having a top and bottom surface and longitudinal and lateral side edges, lateral hinge means for foldably connecting adjoining panels at adjacent lateral side edges, the panels being foldable about the lateral hinges means wherein the bottom surfaces of one panel will be parallel to the top surface of the next adjacent panel where the ramp is in a stored condition. Longitudinal hinge means adjacent longitudinal side edges for foldably connecting support panels adjacent longitudinal side edges of each panel and lateral hinge means on lateral edge of the support panel for connecting the support panels together so as to be foldable with the ramp panels. Whereby in use the ramp panels are co planar and the support panels are co planar and normal to the ramp panels to support a load on the top surface of the ramp panels.

BRIEF DESCRIPTION OF THE DRAWINGS

In the drawings which illustrate preferred embodiment of the invention

FIG. 1 is top plan view of a ramp configured in accordance with this invention prior to folding for storage purposes FIG. 2 is a side elevational view of the ramp as shown in FIG. 1

FIG. 3 is a section taken along line 3—3 of FIG. 1

FIG. 4 is a side elevational view of the ramp with support panels in place to support a load prior to positioning the ramp for loading a pick up truck FIG. 5 is a section taken along the line 5—5 of FIG. 4

Figure 6:
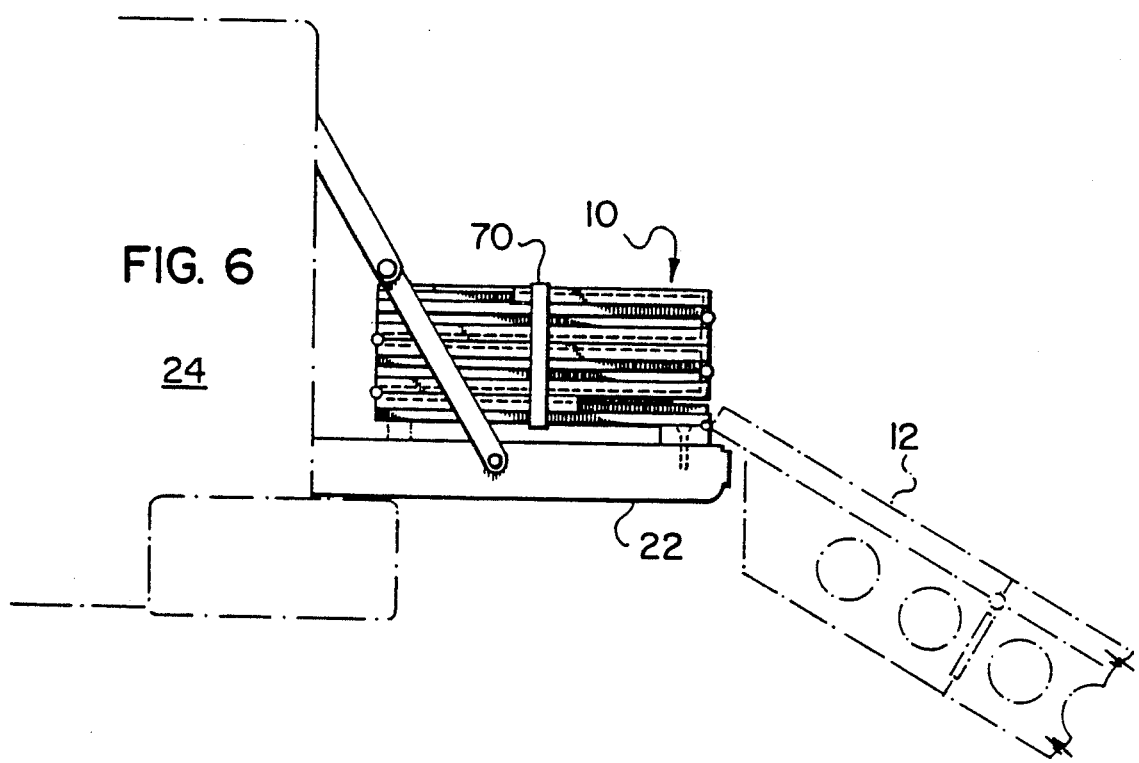

Referring now in detail to the drawings a folding ramp shown generally at 10 in FIG. 1 includes a plurality of ramp panels 12 of suitable material which have lateral and longitudinal side edges 14 and 16 respectively. Lateral side edges 14 have lateral hinges 18 secured thereto as by screws or bolts or as by welding if the panels 12 are constructed of metal, for foldably connecting adjacent panels 12 to allow folding as shown in FIG. 6. A leading free edge of a panel 12 is provided with a hinge 20 for connection to a tail gate 22 of a pick up truck 24 a portion of which is shown in FIG. 6.

Longitudinal hinges 30 are provided at or adjacent longitudinal side edges 16 for foldably connecting support panels 32 to adjacent side edges of associate ramp panels 12.

In FIGS. 1 to 5 the hinges 30 are spaced inwardly from the side edges 16.

Figure 7:
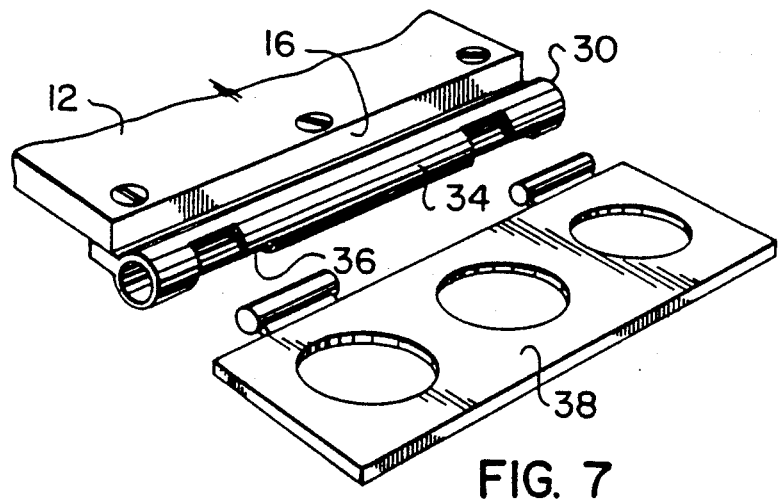
FIG. 6 is a side elevational view of the ramp in folded or stored condition and in use in broken lines and FIG. 7 is a perspective view of the hinged connection between the ramp panels showing a locking feature.

Alternatively, FIG. 7 shows the longitudinal hinge 30 positioned at the side edge 16 of the panel 12. As shown in detail in FIG. 7 one of the hinge parts 34 is provided with a slot 36 so that relative lateral movement of hinge parts 34 and 38 will cause the hinge 30 to lock in a position wherein the hinge parts are at right angles to each other thus locking the support panel 32 in an upright position. The support panels 32 are interconnected by lateral hinges 40 so that panels 32 fold with the panels 12.

The support panels 32 are formed of metal preferably a lightweight alloy and provided with cut outs 50 to reduce weight. A flange 52 formed on the lower edge of the panels 32 increases the rigidity of the panel. The panels 32 at the ends of the ramp are preferably tapered at an angle at 56 and 58 to avoid interference with the ground surface or the tail gate of the vehicle.

A slidable clip 60 of U-shaped cross section is secured to a side edge of the panel 12. This clip 60 slides over the joint between the adjacent panels to lock the panels in a coextensive position as described below.

In use the ramp is carried in the stored condition as shown in FIG. 6 on the tail gate 22 of a vehicle and has the leading edge lateral hinge 20 secured to the tail gate. The ramp is unfolded as required by unfastening the tie straps 70 and unfolding the first ramp panel 12, the clip 60 is then slid over the hinge joint to lock the first two panels together. The remaining ramp panels 12 are then unfolded to an extended position as shown in FIGS. 1 or 6.

The ramp can then be supported in this position by one person as the support panels 32, on each side, are moved to the verticle position and locked to complete the assembly of the ramp.

I claim:

1. A portable lightweight folding ramp consisting essentially of in combination:
   (i) a plurality of ramp panels, each having a top surface, a bottom surface, lateral side edges, and longitudinal side edges;
   (ii) a plurality of support panels, each of which has longitudinal side edges and lateral side edges;
   (iii) first hinge means, foldably connecting together the lateral edges of adjoining ramp panels at adjoining lateral edges, the first hinge means being adapted and constructed such that:
      (a) when the ramp is in the open position, the ramp panels are coplanar; and
      (b) when the ramp is in the stored position, pairs of top surfaces and bottom surfaces are alternately folded against each other, so that the bottom surface of one panel is parallel to the top surface of the next adjacent panel;
   (iv) second hinge means adjacent the ramp panel longitudinal edges foldably connecting longitudinal side edges of at least two support panels to each ramp panel, the second hinge means being adapted and constructed such that:
      (a) when the ramp is in the open position, the support panels are co-planar and substantially normal to the ramp panels; and
      (b) when the ramp is in the stored position, the support panels are co-planar with the ramp panels, and
   (v) third hinge means foldably connecting pairs of lateral edges of the support panels adjacent the ramp panel lateral edges, the third hinge means being adapted and constructed so that when the support panels are folded to be co-planar with the ramp panels, the ramp can be folded into its stored position.

2. A ramp as claimed in claim 1 wherein one hinge part of said lateral hinge is provided with a slot whereby relative longitudinal movement of the other hinge part into said slot causes said hinge to lock said support panel in position normal to said ramp panel.

3. A ramp as claimed in claim 1 wherein clips having U-shaped cross section engage edges of adjoining ramp panels to lock the panels in a coextensive position in use.

* * * * *

UNITED STATES PATENT AND TRADEMARK OFFICE
CERTIFICATE OF CORRECTION

PATENT NO. : 5,062,174

DATED : November 5, 1991

INVENTOR(S) : Stanley A. DeSalvo

It is certified that error appears in the above-identified patent and that said Letters Patent is hereby corrected as shown below:

On the title page, item [76] Inventor: should read --Stanley A. DeSalvo--.

Item [19] should read --DeSalvo--.

Signed and Sealed this

Thirteenth Day of July, 1993

Attest:

MICHAEL K. KIRK

*Attesting Officer*  Acting Commissioner of Patents and Trademarks